United States Patent
Lin et al.

(10) Patent No.: US 11,416,429 B1
(45) Date of Patent: Aug. 16, 2022

(54) MULTI-FUNCTIONAL PCI DUMMY CARD DESIGN

(71) Applicant: ZT Group Int'l, Inc., Secaucus, NJ (US)

(72) Inventors: Ting Yu Lin, Bloomfield, NJ (US); Jinfeng Meng, Woodland Park, NJ (US)

(73) Assignee: ZT Group Int'l, Inc., Secaucus, NJ (US)

( * ) Notice: Subject to any disclaimer, the term of this patent is extended or adjusted under 35 U.S.C. 154(b) by 0 days.

(21) Appl. No.: 15/229,532

(22) Filed: Aug. 5, 2016

(51) Int. Cl.
*G06F 13/40* (2006.01)
*G06F 13/42* (2006.01)

(52) U.S. Cl.
CPC ...... *G06F 13/4022* (2013.01); *G06F 13/4068* (2013.01); *G06F 13/4282* (2013.01)

(58) Field of Classification Search
CPC ............. G06F 13/4022; G06F 13/4068; G06F 13/4282
See application file for complete search history.

(56) References Cited

U.S. PATENT DOCUMENTS

| 7,567,434 | B1 * | 7/2009 | Sivertsen | G06F 1/18 361/679.32 |
|---|---|---|---|---|
| 2006/0082974 | A1 * | 4/2006 | Bordiga | H05K 7/20563 361/711 |
| 2006/0282724 | A1 * | 12/2006 | Roulo | G06F 1/189 714/724 |
| 2007/0032998 | A1 * | 2/2007 | You | G06F 17/5022 703/14 |
| 2007/0038407 | A1 * | 2/2007 | Chandwani | H04Q 1/035 702/130 |
| 2007/0089446 | A1 * | 4/2007 | Larson | G05D 23/1931 62/259.2 |
| 2008/0239677 | A1 * | 10/2008 | Coleman | H01L 23/4093 361/719 |
| 2009/0205197 | A1 * | 8/2009 | Kreissig | H01L 23/4006 29/739 |
| 2009/0288425 | A1 * | 11/2009 | Phan | H01L 23/34 62/3.3 |
| 2011/0006783 | A1 * | 1/2011 | Zhou | G06F 11/261 324/555 |
| 2013/0069428 | A1 * | 3/2013 | Lee | H02J 9/06 307/18 |

(Continued)

OTHER PUBLICATIONS

"PCI Express Base Specification Revision 3.0", PCI-SIG, Section 4.2.4.10.1, Nov. 10, 2010, pp. 242-243.*

(Continued)

*Primary Examiner* — Henry Tsai
*Assistant Examiner* — Harry Z Wang
(74) *Attorney, Agent, or Firm* — Todd A. Noah; Dergosits & Noah LLP

(57) ABSTRACT

A configurable PCI card for connecting to a PCI interface is disclosed. The configurable PCI card comprises a bus interface disposed on a base card for communicatively connecting to a bus of a computing device. The configurable PCI card further comprises a bracket for physically securing the base card to the computing device. The configurable PCI card also comprises a wire layout disposed on the base card for replicating a plurality of different power and heat generation profiles that correspond to a plurality of different chipsets.

17 Claims, 6 Drawing Sheets

(56) References Cited

U.S. PATENT DOCUMENTS

| | | | | |
|---|---|---|---|---|
| 2013/0141126 | A1* | 6/2013 | Liu | G06F 11/24 |
| | | | | 324/750.03 |
| 2013/0156064 | A1* | 6/2013 | Xu | G01R 31/317 |
| | | | | 374/57 |
| 2013/0305207 | A1* | 11/2013 | Hsieh | G06F 17/5009 |
| | | | | 716/136 |
| 2014/0313661 | A1* | 10/2014 | Lin | G06F 1/20 |
| | | | | 361/679.32 |
| 2016/0203246 | A1* | 7/2016 | Chiou | G06F 30/20 |
| | | | | 716/136 |

OTHER PUBLICATIONS

"PCI Express Base Specification Revision 3.0", PCI-SIG, Section 4.2.4.10.1, Nov. 10, 2010, pp. 242-243 (Year: 2010).*

* cited by examiner

MULTI-FUNCTIONAL PCI DUMMY CARD DESIGN

BACKGROUND

Peripheral Component Interconnect (PCI) is a local computer bus for attaching hardware devices (e.g., network cards, RAID cards, sound cards, modems etc.) in a computer. The PCI bus supports functions found on a processor bus in a standardized format that is independent of any particular processor's native bus. PCI provides for interconnection between a microprocessor and attached devices in which expansion slots are spaced closely for high speed operation. Using PCI, a computer can support a variety of devices connected via PCI.

While PCI expansion slots and computer hardware designs provide for specific dimension limitations for devices attached via PCI, there is no industrial standard for the location and/or size of chipsets disposed on a PCI card. Chipset size and location on a PCI card may vary for different manufacturers and models, and could vary greatly in configuration. Furthermore, heat sink designs for these PCI cards will also be different due to chipset differences.

Computer components (e.g., CPUs, chipsets, graphics cards, hard disk drives, etc.) are designed to generate as little heat as possible; however, these components nonetheless produce heat during operation. Heat mitigation measures are taken into account during the design phase in order to prevent the overheating of components, which may lead to temporary or permanent damage to the components. In designing chipsets on a PCI card, heat generation is a concern, particularly since PCI cards are typically located on upstream ends of servers. Thus, the thermal performance of downstream components may be impacted by the heat generated by the upstream PCI cards.

For example, PCI cards could have power generation varying from few watts to hundreds of watts depending on the functionality embodied by the chipsets on the PCI cards. Thus, the PCI cards can produce varying degrees of thermal influence on the rest of the system that is exposed to the downstream air flow of the PCI card. With the continual increase in computing power from more advanced processors and associated components come the challenges of effectively managing temperature of computer components.

Existing PCI dummy cards are fixed in their physical geometries and cannot be configured to simulate multiple chipset locations and dimensions. Using such PCI dummy cards is limited to one card for one particular thermal test. Thus, in order to design a PCI card, a number of PCI dummy cards have to be made and tested. Accordingly, there exists a need for a PCI dummy card design that can be configured to simulate a variety of chipset layouts to produce different heat generation profiles for use during the thermal design and testing phase of PCI cards mounted on other computing devices (e.g., servers).

DETAILED DESCRIPTION

The PCI standard is a high-speed serial computer expansion bus standard that accommodates a variety of types of devices. There is no industry standards for the location and/or size of chipsets disposed on a PCI card. In other words, chipset size and location on a PCI card may vary for different manufacturers and models, and could vary greatly in configuration. Different chipset configurations may produce different heat generation profiles. Furthermore, different chipset configurations typically require in different heat sink designs for the PCI cards. Utilizing a PCI dummy card may thus be helpful in verifying the thermal effect of heat generated from the PCI card components on other computer components in the downstream air flow of a computing device.

Figure 1:
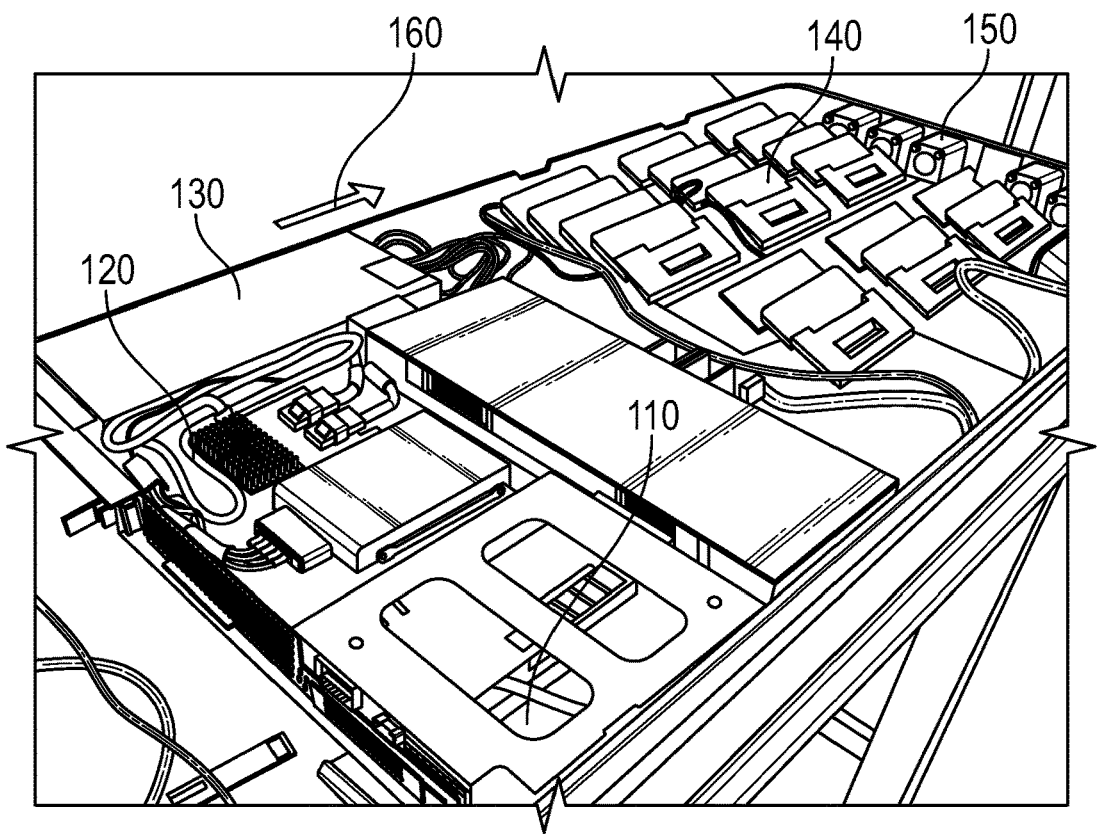
FIG. 1 is a perspective drawing illustrating hardware layout of a server device.

FIG. 1 is a perspective drawing illustrating hardware layout of a server device. As shown in the figure, one or more PCI cards 110 are disposed in one section of the server device layout. Adjacent to the one or more PCI cards 110 is the processing unit 120 of the server. A power supply 130 is also show in FIG. 1, which provides power to all the components of the server device. Additionally, an array of computer components 140 may be disposed at another section of the server device layout. For example, the computer components 140 may include an array of hard drives of the server device. In the example shown in FIG. 1, 18 individual hard drives are disposed across three rows of six hard drives each on the server device. The hard drives are utilized to store data hosted by the server device. Furthermore, these hard drives may be connected to the server device via a PCI bus.

At the far end of the server device is an array of fans 150. The array of fans 150 shown in FIG. 1 are mounted at the exhaust side of the server device and are used cause air to exit the server device so as to create negative pressure within the server device. The negative pressure within the server device, in turn, causes cooler air in the environment surrounding the server device to be drawn into the server device, thereby providing a cooler environment within the server device in which the computer components operate. The air being drawn into the server device and blown out of the exhaust side produces an airflow direction as represented by arrow 160. As indicated by arrow 160 in FIG. 1, this airflow is in the direction from the PCI cards 110 to the computer components 140. Accordingly, heat generated by the PCI cards 110 becomes a concern since the PCI cards 110 are located on upstream ends of servers and the thermal performance of downstream components may be impacted by the heat generated by the upstream PCI cards 110.

Figure 2A:
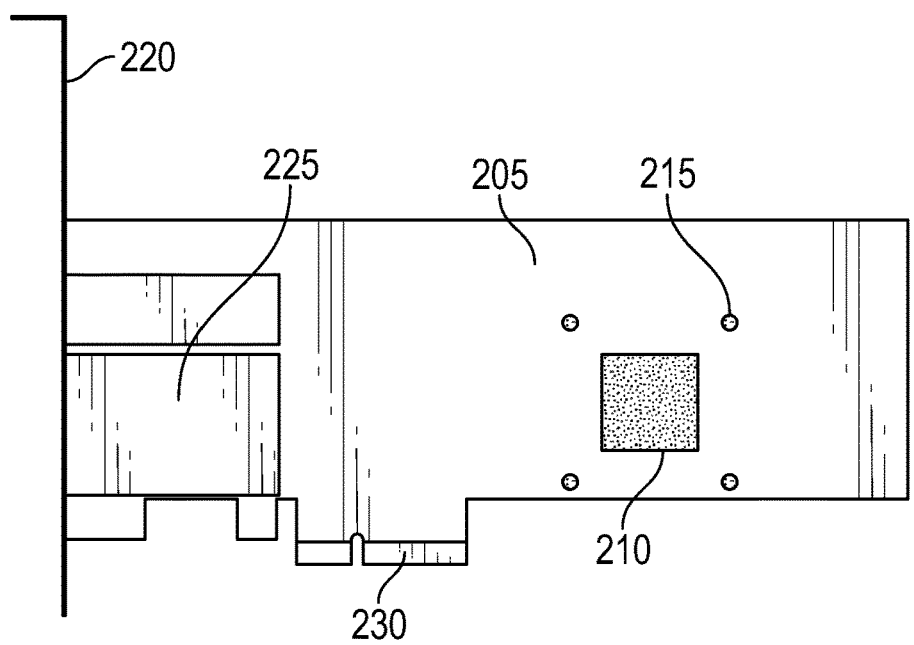
FIGS. 2a-2c are schematic drawings of three different example PCI card layouts.
Figure 2B:
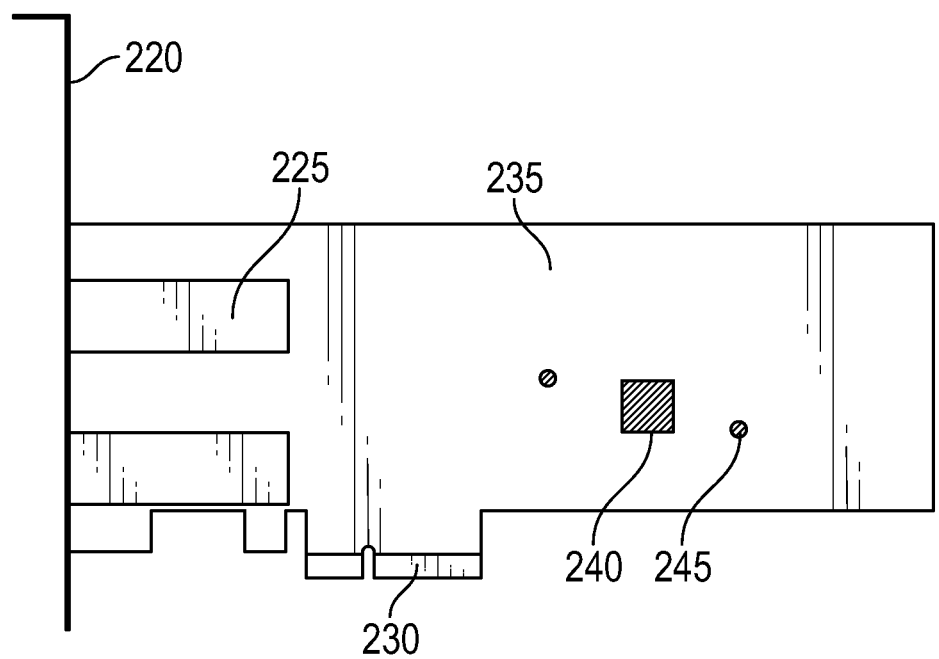
Figure 2C:
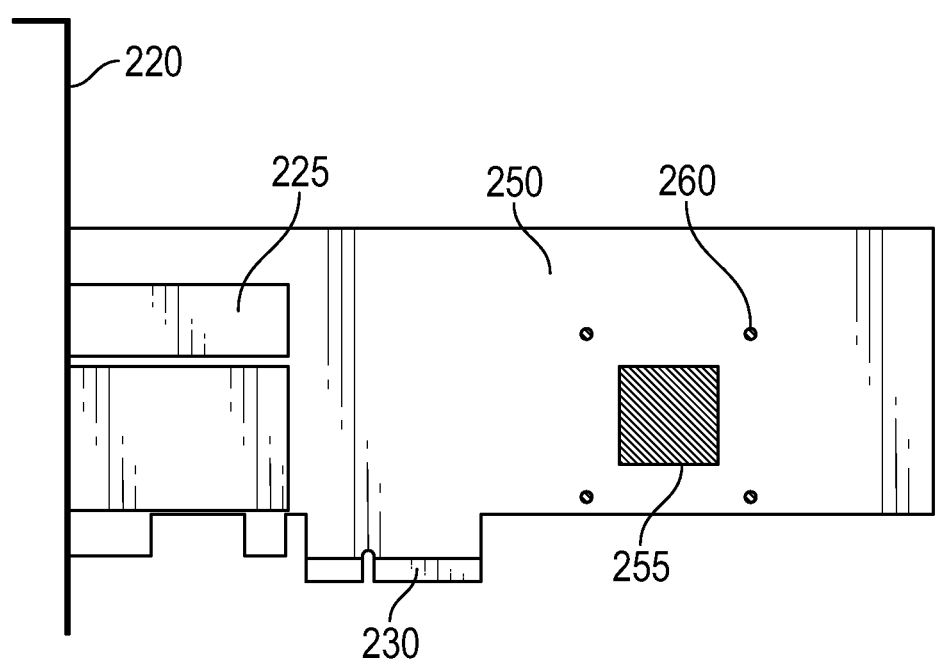

FIGS. 2a-2c are schematic drawings of three different example PCI card layouts. Each of the three example PCI cards shown have a different chipset dimension and location, and corresponding heat sink dimension and mounting location. FIGS. 2a-2c correspond to three different PCI card layouts currently available from ZT Systems.

FIG. 2a shows a first PCI card layout 205. More specifically, the first PCI card layout 205 depicted in FIG. 2a is a PCI Express (PCIe) standard card, which is a high-speed serial computer expansion bus that has replace older bus standards, such as SAS and SATA. PCIe has advantages over the older bus standards that make it more optimal for a variety of computer components. Among the PCIe advantages are higher bus throughput, better scaling for connected bus devices, better error detection and reporting, hot-plug capability, and lower connector pin counts which results in smaller connector dimensions.

PCIe can accommodate numerous types of devices. Certain devices, when installed in a host computing or server device, may perform better in particular orientations with respect to the host. For example, a PCIe card with a particular chipset configuration may have a preferred orientation for heat-dissipation given an existing airflow in the drive bay of a host computing or server device.

The first PCI card layout 205 includes a first chipset 210 shown as a square chipset. The first chipset 210 is shown to have a first set of heat sink mounting holes 215. The first set of heat sink mounting holes 215 includes four heat sink mounting holes that correspond to the shape and size of the first chipset 210. As shown in FIG. 2a, there is one heat sink mounting hole that corresponds to each corner of the first chipset 210. The first set of heat sink mounting holes 215 is utilized to mount a heat sink above the first chipset 210 in order to help dissipate the heat generated by the first chipset 210.

The first PCI card layout 205 also includes standard mechanical fittings such as a full height bracket 220, a set of connectors 225, and a PCI bus interface 230. The set of connectors 225 are attached to the full height bracket 220 for attachment to other devices. For example, the set of connectors 225 in the first PCI card layout 205 includes three SFP28 female connectors that provide for communication with other peripheral devices that are attached via the three SFP28 female connectors. The PCI bus interface 230 disposed on a side of the first PCI card layout 205 adjacent to the full height bracket 220 may be used to connect the PCI card to the server board. The PCI bus interface 230 allows for quick installation and removal of the PCI card.

FIG. 2b shows a second PCI card layout 235. The second PCI card layout 235 includes a second chipset 240 also shown as a square chipset. However, the second chipset 240 of the second PCI card layout 235 is smaller in sized than the first chipset 210 of the first PCI card layout 205. The second chipset 240 is shown to have a second set of heat sink mounting holes 245. Since the second chipset 240 is smaller in size than the first chipset 210, the second set of heat sink mounting holes 245 includes only two heat sink mounting holes that correspond to the shape and size of the second chipset 240. As shown in FIG. 2b, there is one heat sink mounting hole on each side of the second chipset 240. The heat sink mounting hole on the left side of the second chipset 240 is shown as being slightly higher than the heat sink mounting hole on the right side. The second set of heat sink mounting holes 245 is utilized to mount a heat sink above the second chipset 240 in order to help dissipate the heat generated by the second chipset 240.

The second PCI card layout 235, like the first PCI card layout 205, also includes standard mechanical fittings such as a full height bracket 220, a set of connectors 225, and a PCI bus interface 230. The set of connectors 225 are attached to the full height bracket 220 for attachment to other devices. For example, the set of connectors 225 in the second PCI card layout 235 include two SFP28 female connectors that provide for communication with other peripheral devices that are attached via the set of SFP28 female connectors. The PCI bus interface 230 disposed on a side of the second PCI card layout 235 adjacent to the full height bracket 220 may be used to connect the PCI card to the server board. As mentioned above, the PCI interface allows for quick installation and removal of the PCI card.

FIG. 2c shows a third PCI card layout 250. The third PCI card layout 250 includes a third chipset 255, again shown as a square chipset. The third chipset 255 of the third PCI card layout 250 is the same size as the first chipset 210 of the first PCI card layout 205; however, it is at a different location relative to the third PCI card layout 250 from where the first chipset 210 is located relative to the first PCI card layout 205. The third chipset 255 is also shown to have a third set of heat sink mounting holes 260. Like the first PCI card layout 205, the third set of heat sink mounting holes 260 includes four heat sink mounting holes that correspond to the shape and size of the third chipset 255. As shown in FIG. 2c, there is one heat sink mounting hole that corresponds to each corner of the third chipset 255. The third set of heat sink mounting holes 260 is utilized to mount a heat sink above the third chipset 255 in order to help dissipate the heat generated by the third chipset 255.

The third PCI card layout 250, like the first PCI card layout 205, also includes standard mechanical fittings such as a full height bracket 220, a set of connectors 225, and a PCI bus interface 230. The set of connectors 225 are attached to the full height bracket 220 for attachment to other devices. For example, the set of connectors 225 in the first PCI card layout 205 includes three SFP28 female connectors that provide for communication with other peripheral devices that are attached via the three SFP28 female connectors. The PCI bus interface 230 disposed on a side of the third PCI card layout 250 adjacent to the full height bracket 220 may be used to connect the PCI card to the server board. This interface allows for quick installation and removal of the PCI card.

While the first, second and third PCI card layouts described above and shown in FIGS. 2a-2c depict PCIe cards, one of ordinary skill in the art can appreciate a variety of different buses and cards may be similarly used for connecting processor and data storage cards to a server board. Furthermore, cards that are attachable to computing devices via a PCIe bus may come in a variety of shapes and sizes. The only limitations are that the bus interface of the PCI card be properly oriented in reference to the full height bracket, and that the PCI card be within the prescribed geometric dimensional limitations of the computing device architecture.

Figure 3:
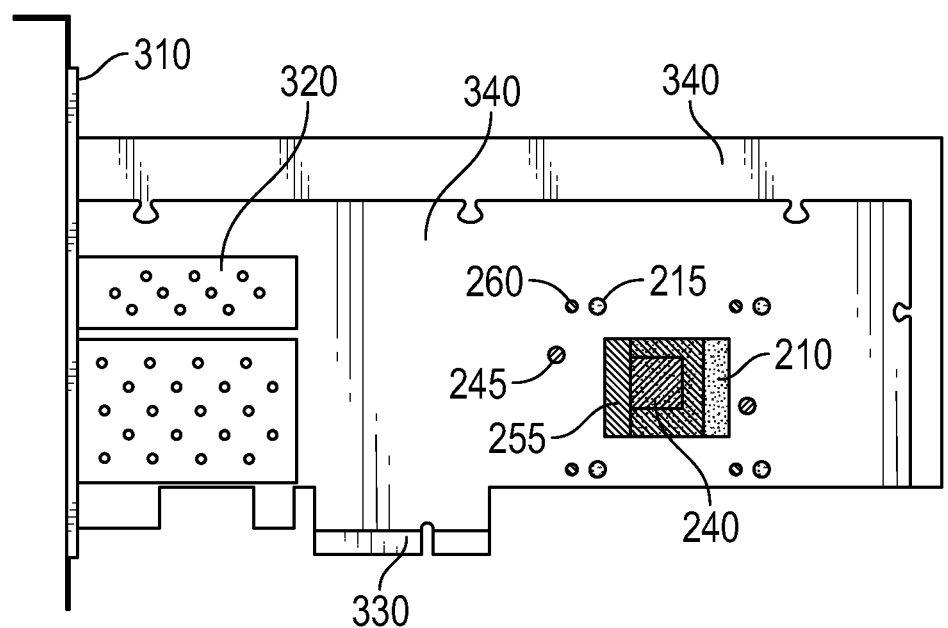
FIG. 3 is a schematic drawing illustrating a PCI dummy card according to an embodiment.

FIG. 3 is a schematic drawing illustrating a PCI dummy card 300 according to an embodiment. The PCI dummy card 300 is used to observe how thermal performance of downstream components may be impacted by the heat generated by the upstream PCI cards. For example, the PCI dummy card 300 may be configured to generate a specific heat profile from a specific PCI card size and dimension PCI. In other words, different characteristics of different PCI cards may be integrated into a single PCI dummy card for testing purposes. Accordingly, a single PCI dummy card can be configured to replicate the heat generation characteristics for PCI cards of a variety of different configuration.

The PCI dummy card 300 shown in FIG. 3 represents a combination of the card layouts from FIGS. 2a-2c. For demonstration purposes, first, second and third chipsets 210, 240 and 255 are all shown in the PCI dummy card 300 superimposed on one another and represented by different style hashes Like PCI card layouts 205, 235 and 250, standard mechanical fittings such as full height bracket 310, a set of SFP28 female connectors 320, and a PCIe x1 interface 330 are disposed on the PCI dummy card 300. The PCI dummy card 300, as shown, represents a base card 340. However, an expansion card 350 may be added to the base card 340 to represent a PCI card of an alternative embodiment with an alternative (i.e., larger) dimension. Typically, maximum power for the low profile base card 340 is 25 watts (W). The addition of the expansion card to create a high profile card can handle power of up to 75 W.

In one embodiment, the PCI dummy card 300 provides flexible PCI card dimensions. In addition to the base card 340, which carries all the electronics, an extra expansion card 350 may be attached to the base card 340. The additional dimension of the expansion card 350, when added to the base card 340, produces an alternative overall PCI card dimension. The example in FIG. 3 shows only one version the expansion card 350. However, a variety of differently sized expansion cards may be used to replicate a variety of PCI card dimensions that are available from different companies.

The PCI dummy card 300 also provides for flexible PCI chipset location and dimension. In FIG. 3, the first, second and third chipsets 210, 240 and 255 for first, second and third PCI card layouts 205, 235 and 250 are shown in reference to the PCI dummy card 300. Each of the first, second and third chipsets 210, 240 and 255 occupy substantially the same are on their respective PCI cards, and thus are shown superimposed on one another in FIG. 3. Additionally, the PCI dummy card 300 shows first, second and third sets of heat sink mounting holes 215, 245 and 260 having been drilled into the PCI dummy card 300 to accommodate mounting points for three different heat sinks corresponding to three different chipsets.

Figure 4:
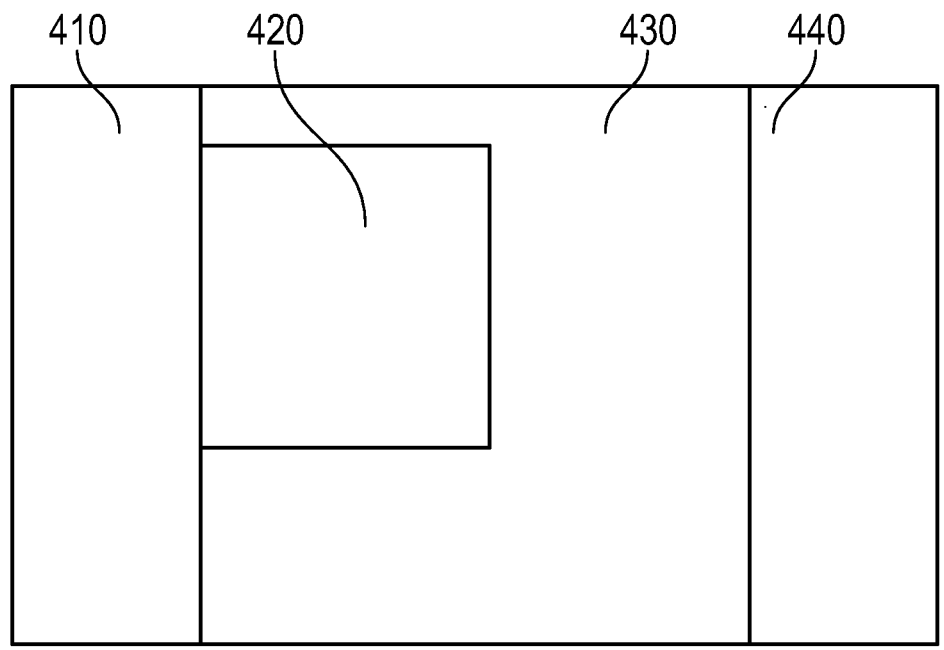
FIG. 4 is a schematic drawing illustrating a simplified chipset layout of a PCI card.

Consider the chipset geometry of the first, second and third PCI card layouts 205, 235 and 250, the combination of the three chipsets can be simplified into the chipset layout shown in FIG. 4. Specifically, some combination of the four regions shown in FIG. 4 can be used to represent each of the first, second and third chipsets 210, 240 and 255. For example, the second region 420 may be used to represent the second chipset 240 in terms of size and shape. Similarities of the second region 420 and the second chipset 240 can be identified by comparing the shape and size of the second region 420 in FIG. 4 to that of the second chipset 240 in FIGS. 2b and 3.

Furthermore, a combination of the second region 420, third region 430 and fourth region 440 may be used to represents the first chipset 210 in terms of size and shape. Again, a comparison of the combination of the second region 420, third region 430 and fourth region 440 in FIG. 4 with the first chipset 210 in FIGS. 2b and 3 will show the likeness of the shape and size of between the two. That is, the combination of second, third and fourth regions 420, 430 and 440 covers substantially the same area and represents substantially the same shape as the first chipset 210.

Likewise, a combination of the first region 410, second region 420 and third region 430 may be used to represents the size and shape of the third chipset 250. This likeness is shown by comparing the combination of the first region 410, second region 420 and third region 430 in FIG. 4 with the third chipset 250 in FIGS. 2b and 3. That is, the combination of first, second and third regions 410, 420 and 430 covers substantially the same area and represents substantially the same shape as the third chipset 250.

While a design that includes the first, second, third and fourth regions shown in FIG. 4 may be used to represent first, second and third chipsets, this design is merely an example of one combination of regions that is used to replicate different chipsets that may be disposed on a PCI card. Thus, one of ordinary skill in the art can appreciate a variety of different regions with different dimensions and sizes can be used to represent a variety of different chipsets that may be disposed on a PCI card. In other words, a PCI dummy card can be designed to represent a set of different PCI cards with chipsets of different sizes, shapes and locations on the PCI card.

Since the PCI dummy card 300 is used only for the thermal testing, the chipset on the PCI dummy card 300 does not have to function like a real chip as long as it is able to generate a desired power and heat profile. Accordingly, the PCI dummy card 300 may simply use electrical resistance wires to generate power/heat that which may be generated by a variety of different chipsets.

Figure 5:
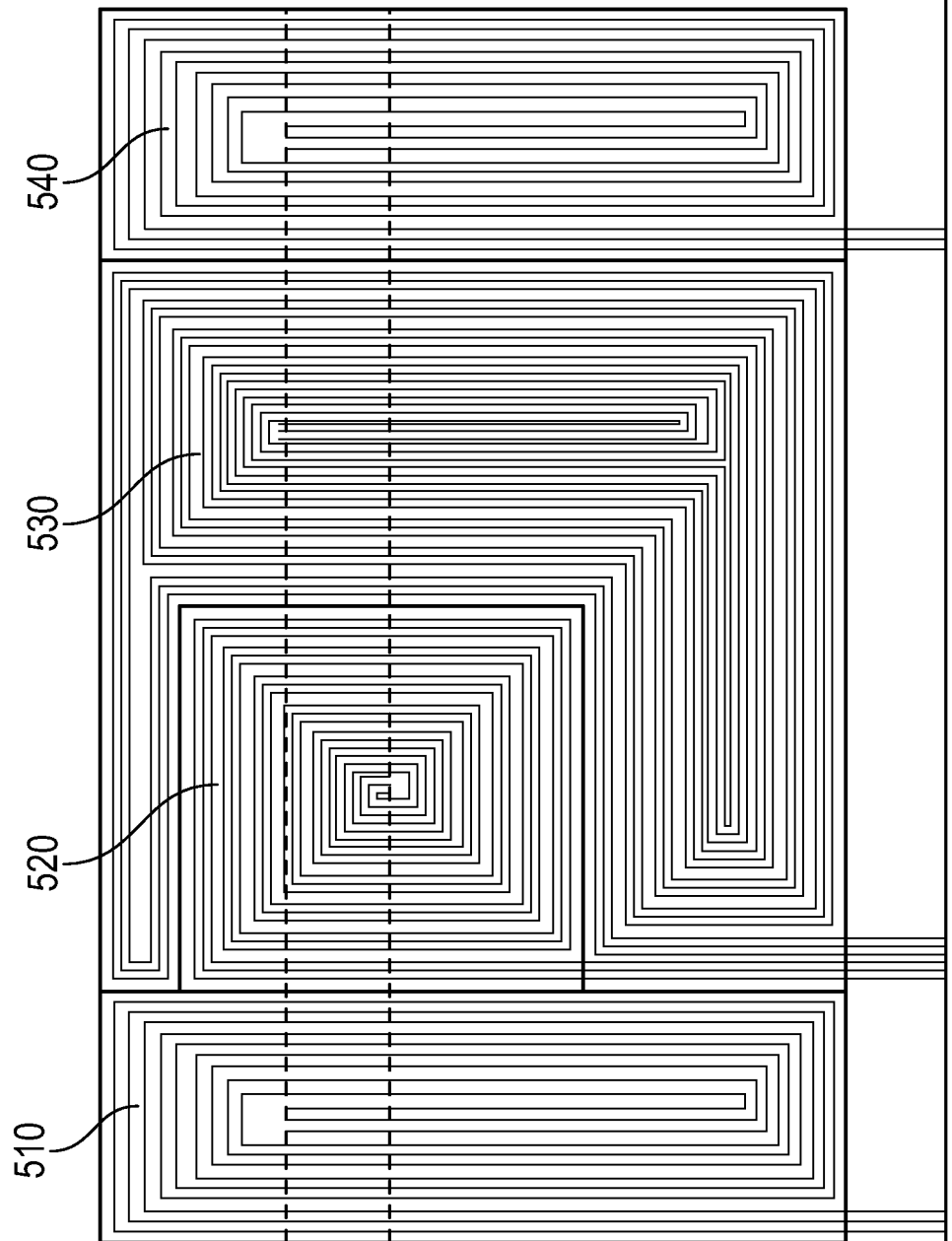
FIG. 5 is a schematic drawing illustrating a wire layout of the chipset of the PCI dummy card.

FIG. 5 provides a schematic drawing illustrating a wire layout of the chipset of the PCI dummy card. First, second, third and fourth regions 410, 420, 430 and 440 in FIG. 4 represent first resistance wire 510, second resistance wire 520, third resistance wire 530 and fourth resistance wires 540, respectively. The first, second, third and fourth resistance wires are wired in parallel with respect to one other so that they could be used together or separately in order to achieve the desired chipset location and dimension.

The second resistance wire 520, which corresponds to the second region 420 that represents the size and shape of the second chipset 240, may be used to replicate the power/heat generation of the second chipset 240. Additionally, the second resistance wire 520, third resistance wire 530 and fourth resistance wire 540, which corresponds to the second region 420, third region 430 and fourth region 440 that represents the size and shape of the first chipset 210, may be used to replicate the power/heat generation of the first chipset 210. Lastly, the first resistance wire 510, second resistance wire 520 and third resistance wire 530, which corresponds to the first region 410, second region 420 and third region 430 that represents the size and shape of the third chipset 250, may be used to replicate the power/heat generation of the third chipset 250. By wiring the first, second, third and fourth resistance wires in parallel with respect to each other, the wire layout is able to provide different PCI power by selecting a combination of the four resistance wire.

Figure 6:
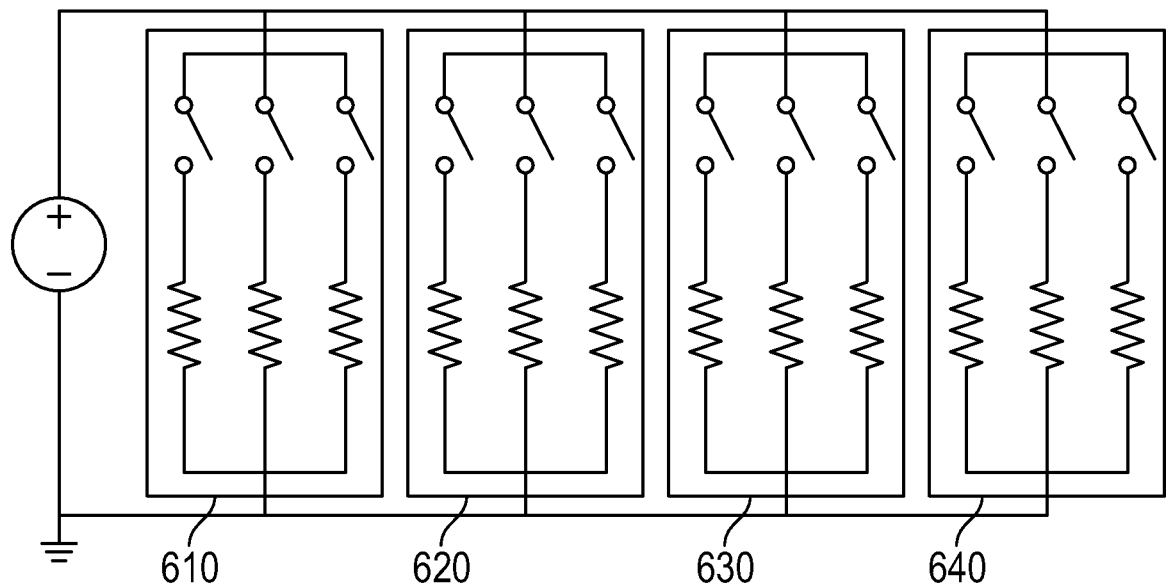
FIG. 6 provides a detailed electrical circuit schematic of the chipset of the PCI dummy card.

FIG. 6 provides a detailed electrical circuit schematic of the chipset of the PCI dummy. In order to provide for more flexible power/heat generation on the PCI dummy card 300, each resistance wire that is represented by each region further comprises multiple parallel resistance wires. In the example shown in FIG. 6, three branches of resistors are used for each of the first, second, third and fourth resistance wires. In other words, a total of 12 resistors are wired in parallel. The 12 resistors in FIG. 6 comprise a first set of resistors 610, a second set of resistors 620, a third set of resistors 630 and a fourth set of resistors 640. Each set of resistors corresponds to the first resistance wire 510, second resistance wire 520 and third resistance wire 530. Thus, each set of resistors also represent the first region 410, second region 420 and third region 430 and fourth region 440.

In an embodiment, each resistance wire uses a 12 volt (V) direct current (DC) power supply from the motherboard of the computing device. Each resistance wire further has a switch at each branch of resistors. The switch is wired in series with each resistor of each branch. By alternating the switch to on and off settings, different powers may be produced. The switches used may be electronics switches controlled by software, or alternatively, the switches may be jumpers or push-pin which can be manually inserted. By providing the capability to have current pass through any combination of resistors in the branches of resistors, various power and heat generation levels may be produced for each of the first, second, third and fourth regions. Thus, a high level of granularity may be provided for controlling the amount of power and heat generation for each region.

While the example shown in FIG. 6 shows three branches of resistors are disposed in each of the four regions, one of ordinary skill in the art can appreciate that additional resistors may be included to provide further fine tuning of power/heat profiles. Since the switches provide for on/off states for each of the resistors, the variation in the resistance can be calculated as $2^N$ for each region, where N is the number of switches/resistors.

To further demonstrate how the switches may be utilized to generate a specific power/heat profile, applying 25 W onto third chipset 255 which includes the first set of resistors 610 (R1), second set of resistors 620 (R2) and third set of resistors 630 (R3), in order to get uniform power, the power needed on the first set of resistors 610 would be:

$$Power_{R1} = \frac{Area_{R1}}{Area_{R1+R2+R3}} \times 25W \approx \frac{1}{4} * 25W = 6.25W \quad \text{(Equation 1)}$$

Additionally, if the three wires in R1 have the power of 1 W, 2 W, and 3 W, respectively at 12V of DC power supplied, by switching on all three branches in the circuit would produce a total power of up to 6 W, which is approximate to the target 6.25 W calculated above. The same method may be applied to the second set of resistors 620 (R2) and third set of resistors 630 (R3). Different combinations of wires with different resistance values may be selected in this configuration to generate different target powers. For example, if a power of 4 W is targeted, then the 1 W and 3 W branches are switched on and the 2 W branch is switched off. The set of three wires in R1 having powers of 1 W, 2 W, and 3 W is an exemplary embodiment of the wire layout; however, those of ordinary skill in the art will appreciate that the wires may have different resistive values to produce different combinations of powers. Furthermore, resistors in this design are sources of heat. Thus, the power generated by the resistors is released in the form of heat.

Figure 7:
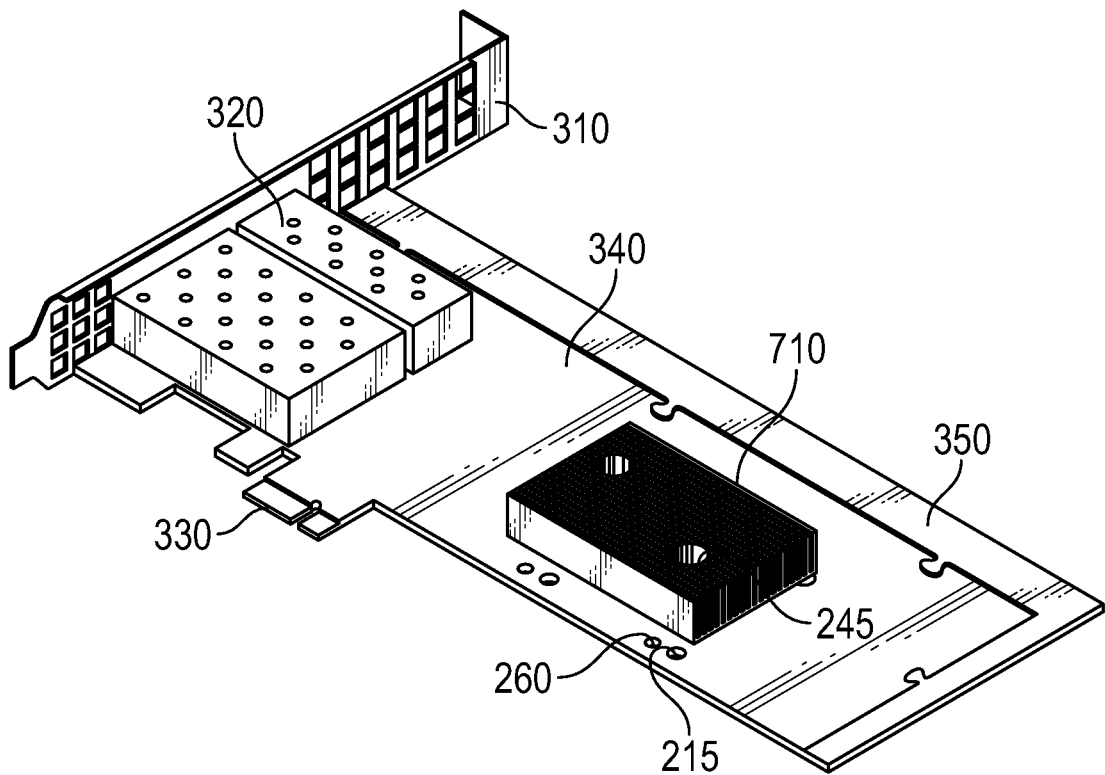
FIG. 7 illustrates a 3-dimensional model of the PCI dummy card with an exemplary heat sink design.

FIG. 7 provides an illustration of a 3-dimensional model of the PCI dummy card with an exemplary heat sink design. As shown in FIG. 3, first, second and third sets of heat sink mounting holes 215, 245 and 260 are drilled into the PCI dummy card to provide mounting points for three different heat sinks corresponding to three different chipsets. In the example PCI dummy card 700 shown in FIG. 7, a heat sink 710 is mounted by the two holes shown as the second set of heat sink mounting holes 245 in FIG. 2. This two-hole configuration corresponds to the second chipset, which has a smaller dimension than the first and third chipsets. Thus, the heat sink 710 may be smaller in size relative to heat sinks that correspond to the first and third chipsets. The PCI dummy card 700 also shows that some of the holes from the first and third sets of heat sink mounting holes 215 and 260.

Beneath the heat sink 710 of the PCI dummy card 700 shown in FIG. 7 is the wire layout and electrical circuit described in FIGS. 5 and 6. Since the heat sink 710 corresponds to the second chipset, the PCI dummy card 700 is used for thermal testing of the second chipset. In other words, the PCI dummy card 700 is configured in a way such that second region including second resistance wire corresponding to the second set of resistors are utilized during the test.

Additionally, the PCI dummy card 700 if FIG. 7 is shown to include PCI bus interface 330 and a full height bracket 310. Attached to the full height bracket 310 is a set of connectors 320 (e.g., a set of three SFP28 female connectors). As discussed above, the set of connectors 225 provides for communication with other peripheral devices that are attached via the connectors. Lastly, FIG. 7 depicts an expansion card 350 that is added to the base card 340 of the PCI dummy card 700 to provide the alternative embodiment of a larger dimension PCI card. As discussed above, the maximum power for the high profile card with the expansion card 350 is 75 W.

Utilizing the features described above, the PCI dummy card design provides for custom configuration of dimensions of the chipset, chipset locations, power/heat profiles and heat sink attachment points on a single card. The PCI dummy card may be further configured to represent both a low profile (i.e., maximum of 25 W) and a high profile (i.e., maximum of 75 W) PCI card. During the design phase, the card designer is provided with the ability to simulate a number of different PCI chipsets and corresponding power/heat profiles utilizing a single configurable PCI dummy card.

Figure 8:
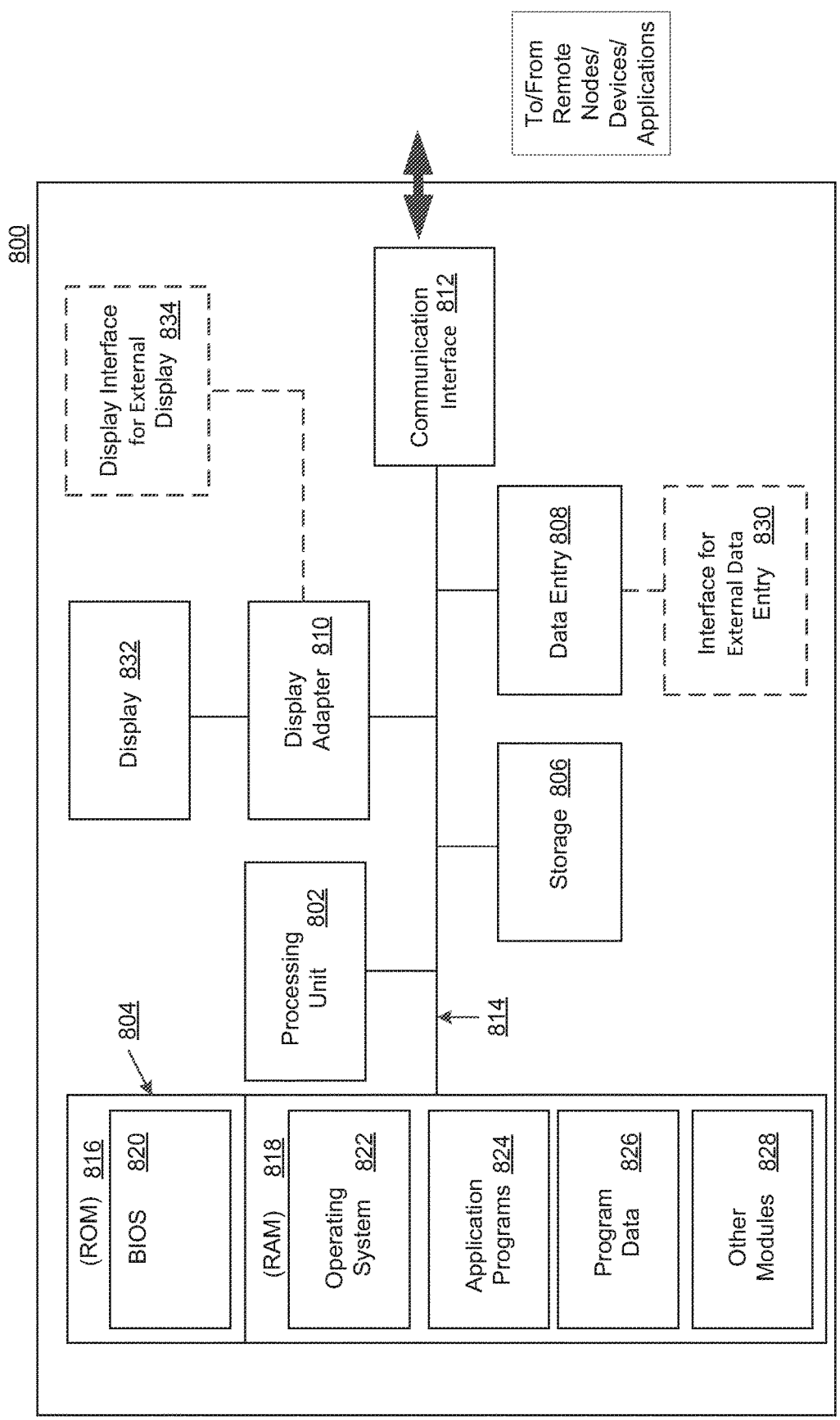
FIG. 8 illustrates an exemplary hardware device in which the embodiments may be implemented.

FIG. 8 illustrates an exemplary hardware device in which the embodiments may be implemented. Those of ordinary skill in the art will appreciate that the elements illustrated in FIG. 8 may vary depending on the system implementation. With reference to FIG. 8, an exemplary system for implementing the embodiments disclosed herein includes a hardware device 800, including a processing unit 802, memory 804, storage 806, a data entry module 808, a display adapter 810, a communication interface 812, and a bus 814 that couples the elements 804-812 to the processing unit 802.

The bus 814 may comprise any type of bus architecture, for example a PCIe bus as described above. The processing unit 802 is an instruction execution machine, apparatus, or device and may comprise a microprocessor, a digital signal processor, a graphics processing unit, an application specific integrated circuit (ASIC), a field programmable gate array (FPGA), etc. The processing unit 802 may be configured to execute program instructions stored in the memory 804 and/or the storage 806 and/or received via the data entry module 808.

The memory 804 may include read only memory (ROM) 816 and random access memory (RAM) 818. The memory 804 may be configured to store program instructions and data during operation of the hardware device 800. In various embodiments, the memory 804 may include any of a variety of memory technologies such as static random access memory (SRAM) or dynamic RAM (DRAM), including variants such as dual data rate synchronous DRAM (DDR SDRAM), error correcting code synchronous DRAM (ECC SDRAM), or RAMBUS DRAM (RDRAM), for example. The memory 804 may also include nonvolatile memory technologies such as nonvolatile flash RAM (NVRAM) or ROM. In some embodiments, it is contemplated that the memory 804 may include a combination of technologies such as the foregoing, as well as other technologies not specifically mentioned. When the subject matter is implemented in a computer system, a basic input/output system (BIOS) 820, containing the basic routines that help to transfer information between elements within the computer system, such as during start-up, is stored in the ROM 816.

The storage 806 may include a flash memory data storage device for reading from and writing to flash memory, a hard disk drive for reading from and writing to a hard disk, a magnetic disk drive for reading from or writing to a removable magnetic disk, and/or an optical disk drive for reading from or writing to a removable optical disk such as a CD ROM, DVD or other optical media. The drives and their associated computer-readable media provide nonvolatile storage of computer readable instructions, data structures, program modules and other data for the hardware device 800.

It is noted that the methods for using the systems described herein can be embodied in executable instructions stored in a computer readable medium for use by or in connection with an instruction execution machine, apparatus, or device, such as a computer-based or processor-containing machine, apparatus, or device. It will be appreciated by those skilled in the art that for some embodiments, other types of computer readable media may be used which can store data that is accessible by a computer, such as magnetic cassettes, flash memory cards, digital video disks, Bernoulli cartridges, RAM, ROM, and the like may also be used in the exemplary operating environment. As used here, a "computer-readable medium" can include one or more of any suitable media for storing the executable instructions of a computer program in one or more of an electronic, magnetic, optical, and electromagnetic format, such that the instruction execution machine, system, apparatus, or device can read (or fetch) the instructions from the computer readable medium and execute the instructions for carrying out the described methods. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc, an SSD, and the like.

A number of program modules may be stored on the storage 806, the ROM 816 or the RAM 818, including an operating system 822, one or more applications programs 824, program data 826, and other program modules 828. A user may enter commands and information into the hardware device 800 through the data entry module 808. The data entry module 808 may include mechanisms such as a keyboard, a touch screen, a pointing device, etc. Other external input devices (not shown) are connected to the hardware device 800 via an external data entry interface 830. By way of example and not limitation, external input devices may include a microphone, joystick, game pad, satellite dish, scanner, or the like. In some embodiments, external input devices may include video or audio input devices such as a video camera, a still camera, etc. The data entry module 808 may be configured to receive input from one or more users of the hardware device 800 and to deliver such input to the processing unit 802 and/or the memory 804 via the bus 814.

A display 832 is also connected to the bus 814 via the display adapter 810. The display 832 may be configured to display output of the hardware device 800 to one or more users. In some embodiments, a given device such as a touch screen, for example, may function as both the data entry module 808 and the display 832. External display devices may also be connected to the bus 814 via an external display interface 834. Other peripheral output devices, not shown, such as speakers and printers, may be connected to the hardware device 800.

The hardware device 800 may operate in a networked environment using logical connections to one or more remote nodes (not shown) via the communication interface 812. The remote node may be another computer, a server, a router, a peer device or other common network node, and typically includes many or all of the elements described above relative to the hardware device 800. The communication interface 812 may interface with a wireless network and/or a wired network. Examples of wireless networks include, for example, a BLUETOOTH network, a wireless personal area network, a wireless 802.11 local area network (LAN), and/or wireless telephony network (e.g., a cellular, PCS, or GSM network). Examples of wired networks include, for example, a LAN, a fiber optic network, a wired personal area network, a telephony network, and/or a wide area network (WAN). Such networking environments are commonplace in intranets, the Internet, offices, enterprise-wide computer networks and the like. In some embodiments, the communication interface 812 may include logic configured to support direct memory access (DMA) transfers between the memory 804 and other devices.

In a networked environment, program modules depicted relative to the hardware device 800, or portions thereof, may be stored in a remote storage device, such as, for example, on a server. It will be appreciated that other hardware and/or software to establish a communications link between the hardware device 800 and other devices may be used.

It should be understood that the arrangement of the hardware device 800 illustrated in FIG. 8 is but one possible implementation and that other arrangements are possible. It should also be understood that the various system components (and means) defined by the claims, described below, and illustrated in the various block diagrams represent logical components that are configured to perform the functionality described herein. For example, one or more of these system components (and means) can be realized, in whole or in part, by at least some of the components illustrated in the arrangement of the hardware device 800.

In addition, while at least one of these components are implemented at least partially as an electronic hardware component, and therefore constitutes a machine, the other components may be implemented in software, hardware, or a combination of software and hardware. More particularly, at least one component defined by the claims is implemented at least partially as an electronic hardware component, such as an instruction execution machine (e.g., a processor-based or processor-containing machine) and/or as specialized circuits or circuitry (e.g., discrete logic gates interconnected to perform a specialized function), such as those illustrated in FIG. 8.

Other components may be implemented in software, hardware, or a combination of software and hardware. Moreover, some or all of these other components may be combined, some may be omitted altogether, and additional components can be added while still achieving the functionality described herein. Thus, the subject matter described herein can be embodied in many different variations, and all such variations are contemplated to be within the scope of what is claimed.

In the description herein, the subject matter is described with reference to acts and symbolic representations of operations that are performed by one or more devices, unless indicated otherwise. As such, it is understood that such acts and operations, which are at times referred to as being computer-executed, include the manipulation by the processing unit of data in a structured form. This manipulation transforms the data or maintains it at locations in the memory system of the computer, which reconfigures or otherwise alters the operation of the device in a manner well understood by those skilled in the art. The data structures where data is maintained are physical locations of the memory that have particular properties defined by the format of the data. However, while the subject matter is described in this context, it is not meant to be limiting as those of skill in the art will appreciate that variations of the acts and operations described herein may also be implemented in hardware.

To facilitate an understanding of the subject matter described, many aspects are described in terms of sequences of actions. At least one of these aspects defined by the claims is performed by an electronic hardware component. For example, it will be recognized that the various actions can be performed by specialized circuits or circuitry, by program instructions being executed by one or more processors, or by a combination of both. The description herein of any sequence of actions is not intended to imply that the specific order described for performing that sequence must be followed. All methods described herein can be performed in any suitable order unless otherwise indicated herein or otherwise clearly.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. For example, one skilled in the art will recognize that these embodiments can be practiced without one or more of the specific details, or with other components, systems, etc. And, in other instances, there may be structures or operations not shown, or not described in detail, to avoid obscuring aspects of the described embodiments. Therefore, the scope of the appended claims should be accorded the broadest interpretation so as to encompass all such modifications and similar arrangements.

What is claimed is:

1. A configurable PCI card comprising:
    a bus interface disposed on a base card for communicatively connecting to a bus of a computing device;
    a bracket for securing the base card to the computing device;
    a wire layout disposed on the base card and divided into a plurality of regions, the wire layout including:
        a first region having a first size and a first shape and a first location equal to a size and shape and a location of a first rectangular chipset and including a first plurality of resistance wires,
        a second region having a second size and a second shape and abutting the first region on at least two sides and including a second plurality of resistance wires, and
        a third region having a third size and a third shape and abutting the second region on at least one side and including a third plurality of resistance wires, wherein:
    each plurality of resistance wires run in parallel across the respective region except for sections in which the plurality of resistance wires change direction to conform to the shape of the respective region;
    each individual resistance wire of the first, second, and third pluralities of resistance wires, is distributed across the respective region, and generates heat along its length, such that activation of an individual resistance wire distributes heat across the respective region;
    the combination of the first region, the second region, and the third region has a fourth size, a fourth shape, and a location equal to a size, a shape, and a location of a second rectangular chipset; and
    the wire layout is configured such that:
        selective activation of the first plurality of resistance wires of the first region causes the wire layout to produce a heat generation profile of the first rectangular chipset from the first region; and
        selective activation of the first plurality of resistance wires, second plurality of resistance wires, and third plurality of resistance wires of the first, second, and third regions, causes the wire layout to produce a heat generation profile of the second rectangular chipset from the combination of the first region, the second region, and the third region.

2. The configurable PCI card of claim 1, wherein the wire layout comprises a plurality of switches that can be configured to simulate the heat generation profile of the first chipset and the second chipset.

3. The configurable PCI card of claim 1, wherein each of the plurality of resistance wires comprises a set of resistance wires wired in parallel, each resistance wire being controlled by a corresponding switch.

4. The configurable PCI card of claim 3, wherein the switches are electronics switches controlled by software.

5. The configurable PCI card of claim 3, wherein the switches are one of jumpers or push-pins that can be manually inserted.

6. The configurable PCI card of claim 3, wherein a first configuration of the switches produces the size and shape and heat generation profile of the first rectangular chipset and and a second configuration of the switches produces the size and shape and heat generation profile of the second rectangular chipset.

7. The configurable PCI card of claim 1, the configurable PCI card further comprising a first plurality of heat sink mounting holes and a second plurality of heat sink mounting holes, the first plurality of heat sink mounting holes configured to accommodate attaching a first heat sink to the first region and the second plurality of heat sink mounting holes configured to accommodate attaching a second heat sink to the combination of the first region, the second region, and the third region.

8. The configurable PCI card of claim 1, wherein the base card represents a first PCI card size standard, the configurable PCI card further comprising an expansion card attachable to the base card to form a combined card that represents a second larger PCI card size standard.

9. The configurable PCI card of claim 1, wherein the wire layout is connected to a 12-volt direct current power supply via the bus interface, the power supply being provided by a motherboard of a computing device.

10. The configurable PCI card of claim 1, wherein the bus interface is a PCIe 1× interface for connecting to a PCIe 1× bus.

11. The configurable PCI card of claim 1, further comprising a set of connectors disposed on the base card and attached to the full height bracket.

12. The configurable PCI card of claim 1, wherein the set of connectors provide couplings to peripheral devices.

13. A method for testing thermal performance components downstream from a PCI card, the method comprising:

configuring a PCI dummy card to replicate one of a plurality of different heat generation profiles, each different heat generation profile corresponding to one chipset of a plurality of different chipsets, the PCI dummy card comprising:
   a bus interface disposed on a base card for communicatively connecting to a bus of a computing device;
   a bracket for securing the base card to the computing device;
   a wire layout disposed on the base card and divided into a plurality of regions, the wire layout including:
      a first region having a first size and a first shape and a first location equal to a size and shape and a location of a first rectangular chipset and including a first plurality of resistance wires,
      a second region having a second size and a second shape and abutting the first region on at least two sides and including a second plurality of resistance wires, and
      a third region having a third size and a third shape and abutting the second region on at least one side and including a third plurality of resistance wires, wherein:
   each plurality of resistance wires run in parallel across the respective region except for sections in which the plurality of resistance wires change direction to conform to the shape of the respective region;
   each individual resistance wire of the first, second, and third pluralities of resistance wires, is distributed across the respective region, and generates heat along its length, such that activation of an individual resistance wire distributes heat across the respective region;
   the combination of the first region, the second region, and the third region has a fourth size, a fourth shape, and a location equal to a size, a shape, and a location of a second rectangular chipset; and
   the wire layout is configured such that:
      selective activation of the first plurality of resistance wires of the first region causes the wire layout to produce a heat generation profile of the first rectangular chipset from the first region; and
      selective activation of the first plurality of resistance wires, second plurality of resistance wires, and third plurality of resistance wires of the first, second, and third regions, causes the wire layout to produce a heat generation profile of the second rectangular chipset from the combination of the first region, the second region, and the third region; and
   installing the PCI dummy card into a bus of a motherboard that provides power to the PCI dummy card; and
   measuring the performance of the downstream components to determine a thermal influence of power and heat generated by the PCI dummy card.

14. The method of claim 13, further comprising attaching, to the PCI dummy card, a first heat sink corresponding to the first chipset when the PCI dummy card is configured to replicate the first chipset, and attaching, to the PCI dummy card, a second heat sink corresponding to the second chipset when the PCI dummy card is configured to replicate the second chipset.

15. The method of claim 13, wherein installing the PCI dummy card into a bus of a motherboard comprises installing the PCI dummy card on an opposite end of the motherboard from exhaust fans of the motherboard.

16. The method of claim 13, wherein the PCI dummy is configurable to replicate the heat generation profile of the first chipset or the heat generation profile of the second chipset while the PCI dummy card is installed in the motherboard.

17. The method of claim 13, wherein the PCI dummy card represents a first PCI card size standard, the method further comprising attaching an expansion card to the PCI dummy card to form a combined PCI dummy card that represents a second larger PCI card size standard.

* * * * *